United States Patent Office 3,478,704
Patented Nov. 18, 1969

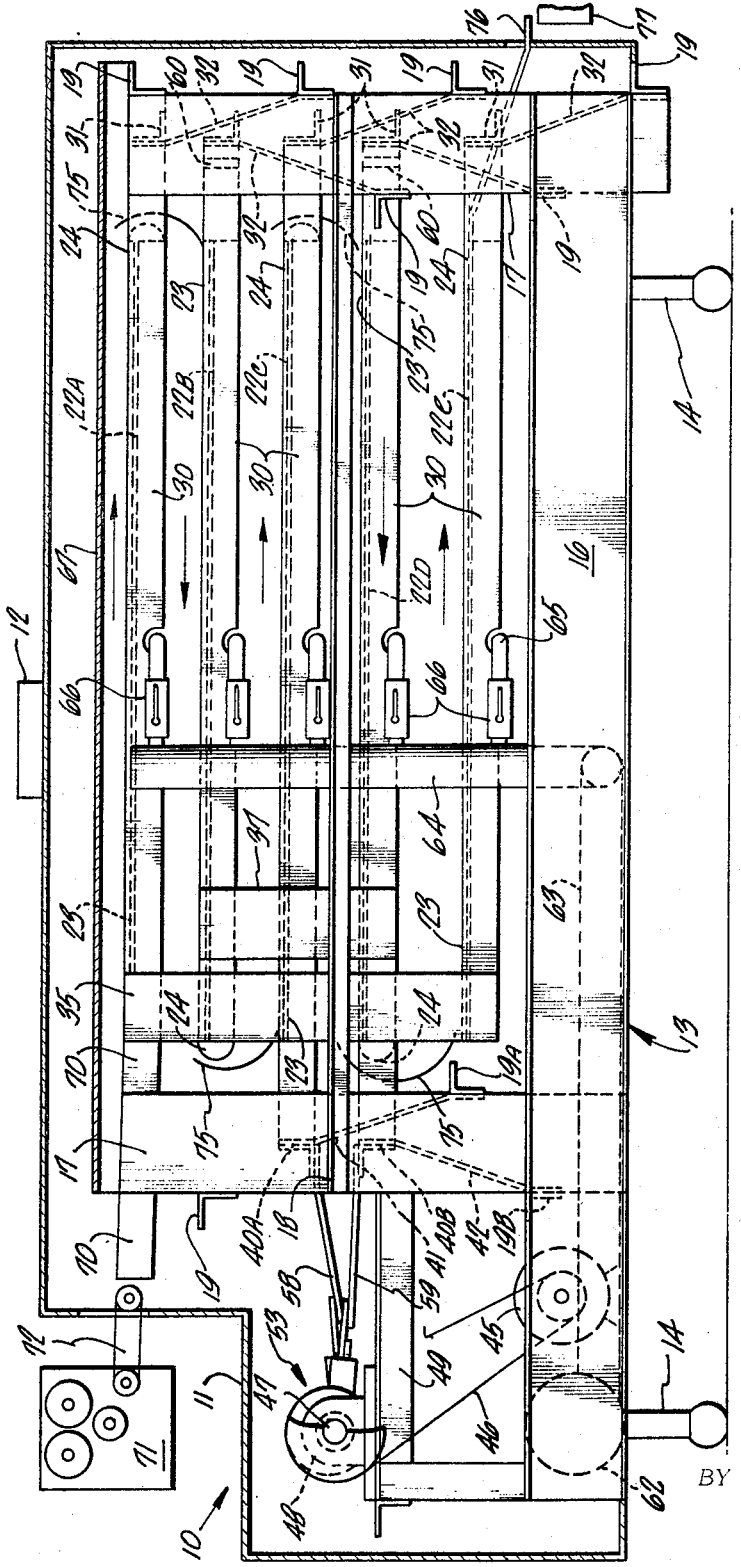

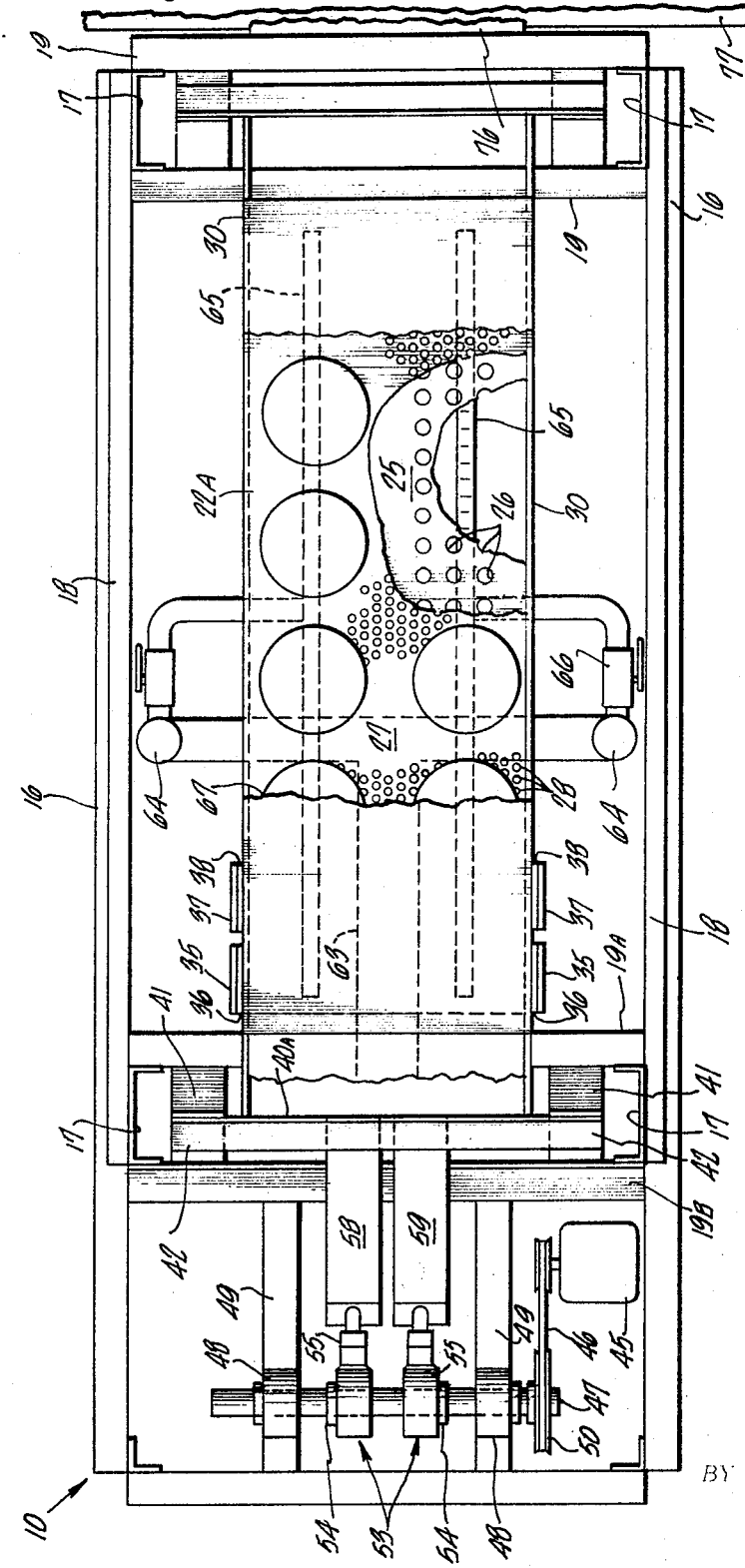

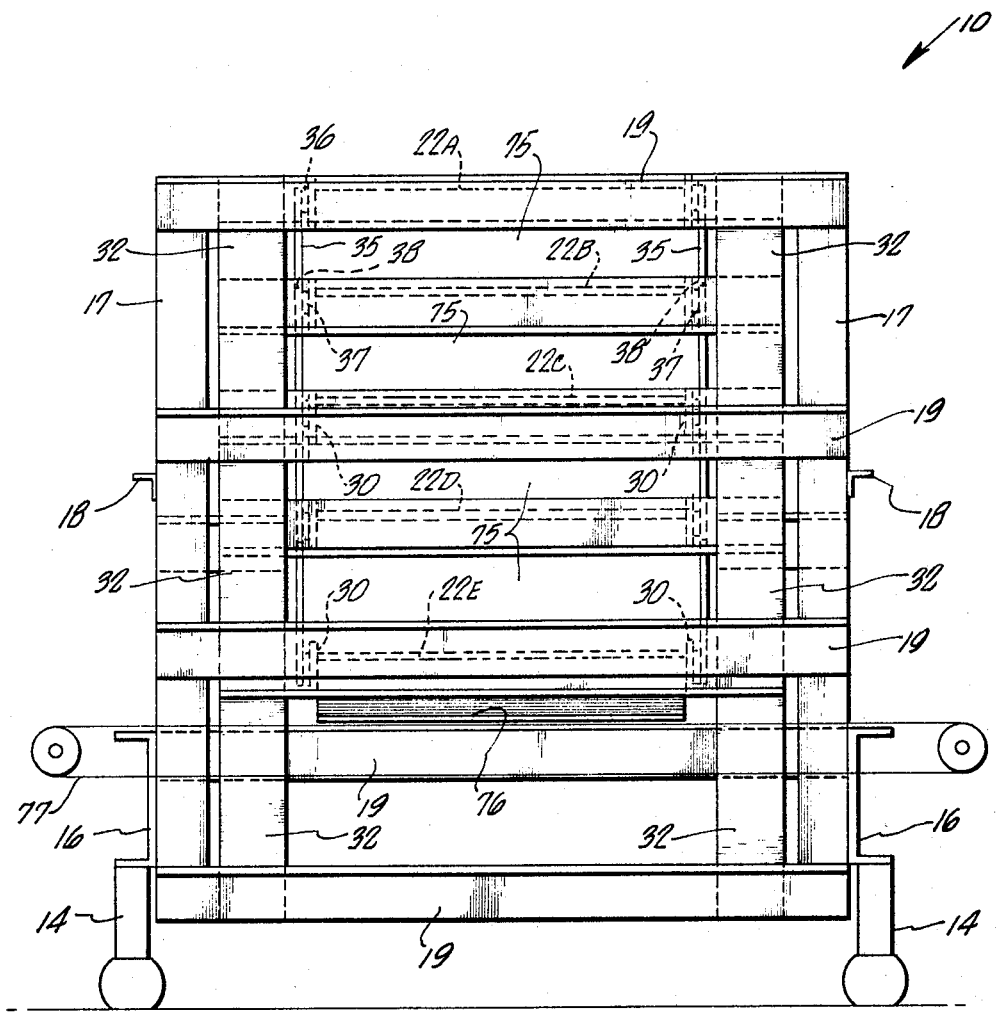

3,478,704
TORTILLA OVEN
John C. Ford, Los Angeles, Calif. (548 Monterey Pass Road, Monterey Park, Calif. 91754)
Filed Aug. 24, 1967, Ser. No. 662,932
Int. Cl. A21b 1/42; B66c 17/08; B65g 27/00
U.S. Cl. 107—55      16 Claims

ABSTRACT OF THE DISCLOSURE

A tortilla oven having a plurality of vibratory or swinging-type conveyor decks disposed in a stack. Vertically adjacent decks move in opposite directions, and guide plates at the deck ends invert and guide tortillas between the decks. The decks are perforated to prevent sticking of tortillas and to provide improved traction. A gas heater is provided under each deck, and a dough dispenser delivers cut portions of tortilla dough to the conveyor.

Background of the invention

Conveyor-type ovens for making products such as tortillas are known, and typically incorporate several stacked stages of conveyors with a guide to deflect and invert the tortillas as they pass between the several conveyors. Several inversions of the tortillas are important to insure thorough cooking of dough forming the tortillas, and a vertically stacked arrangement of conveyors permits the oven to be compactly packaged. A roller-conveyor oven of this type is disclosed in my U.S. Patent 3,310,007 issued Mar. 21, 1967. Endless-belt and slat-belt conveyors have also been used in this type of oven.

While these known tortilla ovens have been satisfactory in many respects, they are relatively complex mechanical assemblies which are expensive to manufacture and maintain. The endless-belt conveyors use chains, sprockets, bearings and other components which require regular adjustment, lubrication and cleaning, and these rotating and other moving parts sometimes fail in the high-temperature environment within the oven. The endless-belt conveyor is also inefficient as there is a considerable heat loss from the belt during its unloaded return travel. Furthermore, tortilla dough tends to stick to the belts (especially during the first "pass" through a multi-pass oven having a stack of separate conveyors), and complex devices have been needed to transfer dough from one conveyor to another.

These problems are particularly apparent in slat-type belt conveyors which leave marks or impressions on the dough and cause folding, tearing or splitting of the cooked product. The slat units often provide uneven baking of the dough, and must be coated with plastic or covered with liquid solutions to minimize dough sticking. Slat-type belts have also been limited in width (and hence oven capacity) due to distortion arising from expansion of metal parts in the hot environment of the oven.

Summary of the invention

The oven of this invention overcomes these drawbacks of known units, is simple and inexpensive to manufacture and maintain, and provides a superior baked product at high production rates. The oven uses a vibratory conveyor which has only a few moving parts, is quiet and trouble-free in operation, and is easily adjusted to provide different conveying rates. The vibratory conveyor has been found to be especially suitable for a tortilla oven as the vibrating conveying action is gentle and tends to seal the surface of the tortilla dough to prevent escape of moisture which is essential to high-quality baked tortillas. The invention will be described in terms of a tortilla baking oven, but is suitable for cooking similar food products such as cookies and the like.

Vibratory conveyors have been used in the past for movement of materials such as coal, sand, grain and the like. Such units are hereinafter referred to as vibratory conveyors, but are also commonly known as grasshopper, reciprocating, swinging, vibrating trough, and Zimmer conveyors. These conveyors incorporate a deck which is either level or slightly inclined, and the deck is mounted such that a product on the deck moves in a series of tiny jumps or hops as the deck is vibrated. This conveying action is very satisfactory in a tortilla oven as sticking of dough on the deck is avoided, and sealing of the dough surface is aided by gentle impacts of the dough on the deck.

Briefly stated, the tortilla oven of this invention comprises a vibratory conveyor including an elongated conveying deck having a feed end and a discharge end. A dough dispenser is positioned to deliver metered portions of dough to the feed end of the deck. Means are provided for heating the deck whereby the dough is cooked as it moves from the feed end to the discharge end of the deck. Preferably, the conveyor deck is mounted in a substantially horizontal position, and includes a plurality of spaced-apart perforations to provide improved traction and to prevent sticking of the dough on the deck.

In a presently preferred form, the oven includes a plurality of baking decks, and mounting means are provided to position the decks to be vertically spaced apart in a stack, the decks being disposed one above another in alternatively opposite orientation so the discharge end of any deck is vertically adjacent the feed end of the next adjacent deck in the stack. Drive means are provided for reciprocating the decks in a horizontal and vertical oscillatory motion whereby a product to be cooked on any deck is conveyed from the feed end toward the discharge end of that deck. Heating means are included for heating all the decks whereby the product is cooked as it is conveyed along the decks. A guide means such as a curved plate is positioned at the discharge end of the upper decks for inverting and guiding the product from the discharge end of the deck to the feed end of the next lower deck in the stack.

Brief description of the drawings

The invention will be described in detail with reference to the attached drawings, in which:

FIG. 1 is a side elevation, partly broken away, of a tortilla oven according to the invention;

FIG. 2 is a top view, partly broken away, of the oven; and

FIG. 3 is an elevation of a discharge end of the oven.

Description of the preferred embodiment

Referring to the drawings, a tortilla oven 10 according to the invention includes a conventional heat-insulated enclosure 11 (deleted in FIGS. 2 and 3 for clarity) having an exhaust vent 12 at its upper end. A frame 13 is supported on legs 14 within the enclosure. The frame includes a pair of elongated, laterally spaced, channel-shaped longitudinal beams 16, and four channel-shaped corner posts 17 are secured to and extend upwardly from the longitudinal beams. Longitudinal brace bars 18 and lateral brace bars 19 are secured to and extend between the corner posts to strengthen and rigidize the frame.

A set of five baking decks 22A through 22E are substantially horizontal, and are positioned one above another within the frame. Each deck has a feed end 23 and a discharge end 24. The decks are alternately oppositely oriented so the discharge end of any deck is vertically adjacent the feed end of the next adjacent deck in the stack.

Each deck includes a plurality of spaced-apart holes to provide improved traction of the product being conveyed. In the form shown in the drawings, the deck includes a base plate 25 having holes 26 of say, one-half inch diameter therethrough with a center-to-center spacing of about two inches. The base plate is covered with a thin sheet 27 of perforated metal having a plurality of closely spaced holes 28 of say, quarter-inch diameter. Alternatively, the base plate can be used without the thin covering sheet, but the illustrated construction is preferred as it provides a rigid base plate with the desired perforated surface being provided in the thin cover sheet.

A pair of side plates 30 are secured to the opposite sides of each deck 22, and the side plates extend longitudinally beyond the ends of the decks to be rigidly secured to crossbars 31. A pair of laterally spaced mounting arms such as leaf springs 32 are secured to each crossbar 31 at the right end (as seen in FIG. 1) of each deck. The leaf springs slope downwardly away from the decks to be rigidly secured to lateral bars 19 as best seen in FIG. 1 The leaf springs are inclined toward the feed end of the conveyor deck to which they are secured, and are preferably sloped at about twenty-five degrees from a vertical axis of the frame. This angulation has been found to produce optimum conveying action.

Decks 22A, 22C and 22E convey toward the right (as seen in FIG. 1), and these decks are rigidly secured together at their left ends by a pair of vertical tie plates 35. The tie plates are slightly laterally spaced from the decks by a pair of spacers 36 so they will clear the sides of decks 22B and 22D. As best seen in FIG. 2, tie plates and spacers 36 are positioned directly against side plates 30, and these units are rigidly secured together by bolting or welding. A similar set of tie plates 37 and spacers 38 are used to secure together the left ends of decks 22B and 22D.

Side plates 30 secured to deck 22C and 22D extend longitudinally beyond the left end of these decks, and ech pair of side plates is joined by cross members 40A and 40B. A pair of leaf springs 41 (identical to springs 32) are rigidly secured to and extend between cross member 40A and a lateral brace bar 19A which is secured across corner posts 17 at the lower left end of the frame. Leaf springs 41 are inclined at about twenty-five degrees from the vertical axis of the frame in the same direction as the inclination of leaf springs 32 secured to the right ends of decks 22A, 22C and 22E. Similarly, a pair of leaf springs 42 are rigidly secured to and extend downwardly from cross member 40B which is coupled to decks 22B and 22D, and the lower end of the springs is rigidly secured to another lateral brace bar 19B secured across corner posts 17 at the lower left end of the frame.

All five decks are thus supported in the frame by the associated leaf springs, brace bars and side plates which form a deck mounting means, and decks 22A, 22C and 22E are secured together by the tie plates to move as a unit. Decks 22B and 22D are also secured together by tie plates to move as a unit. The direction of conveying along the decks is determined by the inclination of the leaf springs, and a product on any deck will be conveyed in a series of short hops or jumps having an initial trajectory approximately perpendicular to the leaf springs associated with that deck. Decks 22A, 22C and 22E will thus convey toward the right (as seen in FIG. 1), and decks 22B and 22D will convey toward the left. Pairs of leaf springs for individual suspension of the right end of each deck are preferred because this permits individual thermal expansion of the decks without inducing warping or stress in the other decks or the frame.

A drive motor 45, of say one-half horsepower, is mounted at the left end of the frame, and drives an endless belt 46. The drive motor includes a conventional variable-speed output transmission (not shown) whereby the rotational speed of the motor is easily adjusted while it is in operation. A shaft 47 is rotatably mounted in a pair of bearings 48 supported on a set of frame members 49, and a drive pulley 50 is rigidly secured at one end of the shaft and engaged with belt 46.

A pair of eccentric bearings 53 are mounted on shaft 47. These bearings include inner hubs 54 which are rigidly secured to shaft 47. The hubs have cam-shaped portions (not shown) and impart an eccentric motion to an outer housing 55 rotatably mounted aorund the hub. The eccentric bearing is of a conventional type such as a Fafnir Bearing Company type 5261, and, for brevity, will not be described in detail.

One of the eccentric bearings is connected to decks 22A, 22C and 22E by a spring arm 58 rigidly secured to the bearing and to cross member 40A which is connected to these decks. The other eccentric bearing is similarly coupled to decks 22B and 22D by a second spring arm 59 secured to and extending between the bearing and cross member 40B associated with these decks. When shaft 47 is rotated by drive motor 45, the eccentric bearings impart a reciprocating oscillatory motion to the two sets of decks.

Preferably, the eccentric bearings are mounted to be 180 degrees out of phase so decks 22A, 22C, and 22E move left as decks 22B and 22D move right. This arrangement provides a partial cancellation of vibration arising from the motion of the decks. Substantially complete cancellation of this vibration is achieved by adding weights 60 at the right ends of decks 22B and 22D to achieve a dynamic-balance condition. Alternatively, an even number of decks (such as four or six decks) can be used in the oven, and the opposite motion of the two sets of decks will provide the desired vibratory cancellation.

A conventional gas burner blower 62 is mounted at the left end of the frame, and is coupled to a gas manifold 63 adapted for connection to a gas supply line (not shown). The manifold is coupled to a conduit 64 which extends upwardly alongside the decks for connection to a set of gas burner pipes 65 through control valves 66. Two burner pipes are disposed under each of the decks, and gas flow to each pipe is individually controlled by valves 66. A cover plate 67 is secured to the frame above upper deck 22A to reflect heat from the burners back toward the top surface of tortillas being cooked.

A loading deck 70 is secured at the left or feed end of deck 22A, and slopes slightly downwardly toward this deck. A conventional dough forming and dispensing unit 71 is shown schematically in FIG. 1, and is positioned adjacent the left end of loading deck 70. Unit 71 can be secured to frame 13, or can be mounted on a separate frame. The unit includes the usual dough rolling and cutting heads, and an output conveyor belt 72 for delivering pre-formed pancake-shaped quantities of tortilla dough to the loading deck.

Unit 71 is a conventional, commercially available unit, and, for brevity, will not be described in detail. Loading deck 70 is oscillated along with deck 22A, and metered quantities of dough delivered by unit 71 are therefore conveyed along the loading deck to be transferred to deck 22A. Alternatively, loading deck 70 can be eliminated, and conveyor belt 72 can be sufficiently elongated to deliver the pre-formed quantities of dough directly to the feed end of deck 22A.

A turn-around guide means such as an arcuate plate 75 is mounted at discharge end 24 between side plates 30 on each of decks 22A, 22B, 22C and 22D. The arcuate plate is positioned to invert and guide a tortilla passing off the discharge end of the deck downwardly onto the next lower deck. A downwardly sloping discharge deck 76 is secured between side plates 30 at the discharge end of lowermost deck E, and delivers cooked tortillas to an output conveyor 77 (shown schematically in the drawings), which may be of the conventional endless-belt type.

In operation, the gas burners in the oven are ignited, and drive motor 45 is operated to oscillate the baking decks. Unit 71 is loaded with tortilla dough, and dispenses pre-formed quantities of dough onto uppermost deck 22A. The dough is cooked as it moves along the deck in a series of short hops or jumps which results from the vibratory oscillation of the deck. The perforations in the deck provide good traction of the dough on the deck and also provide improved heat transfer to the tortillas. As each tortilla reaches the end of deck 22A, it is deflected downwardly and inverted by arcuate plate 75 which constitutes a guide means for guiding each tortilla from the discharge end of deck 22A to the feed end of 22B. The tortilla then progresses along deck 22B to be again inverted and guided by the arcuate plate at the discharge end of this deck. The tortilla similarly passes along decks 22C, 22D and 22E, and finally emerges on discharge deck 76 to be carried away by conveyor 77.

A vibratory frequency of about 500 to 700 cycles per-minute with a double peak-to-peak amplitude of about one-quarter to one-half inch has been found to provide satisfactory conveying action on the decks. The oven may include any number of baking decks, but at least three decks are preferred to invert the tortilla twice for complete cooking. An odd number of decks is selected if the discharge end of the oven is to be opposite the feed end, and an even number of decks is selected if the feed and discharge ends are to be at the same end of the oven. As mentioned above, balancing weights are used to provide smooth operation with an odd number of decks.

Cooking time for a tortilla is typically in the range of thirty seconds to one minute. The five decks shown in the drawings can be about four feet long, to provide twenty feet of cooking surface. Conveying speed is easily adjusted by varying the speed of the drive motor to provide the desired cooking time. Individual adjustment of the gas burners under each deck permits close control of baking temperature which is typically in the range of 500°–600° F.

The oven is constructed of conventional materials such as steel or aluminum. Either of these materials has been found satisfactory for the decks, and the deck perforations insure good heat transfer as well as providing improved traction and reliable conveying action.

What is claimed is:

1. An oven for cooking tortillas and like products, comprising:
   a vibratory conveyor including an elongated conveying deck having a feed and a discharge end, the deck having a discontinuous surface to provide improved traction, and being adapted to transport portions of dough therealong in hopping fashion whereby the dough is subjected to a series of impacts for enhanced sealing and moisture retention, and whereby any tendency of the dough to stick to the conveyor is reduced;
   a dough dispenser adapted to form pancake-shaped portions of dough, and to deliver such portions to the feed end of the deck; and
   means for heating the deck whereby the dough is cooked as it moves from the feed end to the discharge end of the deck.

2. The oven defined in claim 1 in which the conveyor deck is mounted in a substantially horizontal position.

3. The oven defined in claim 1 in which the conveyor deck is made discontinuous by a plurality of spaced-apart perforations to provide improved traction and further to prevent sticking of the dough on the deck.

4. An oven for cooking tortillas and like products, comprising:
   a plurality of baking decks, each deck having a feed end and a discharge end;
   mounting means for positioning the decks to be substantially level and vertically spaced apart in a stack, the decks being disposed one above another in alternately opposite orientation so the discharge end of any deck is vertically adjacent the feed end of the next adjacent deck in the stack, an uppermost one of the decks having a discontinuous surface to provide improved traction;
   drive means for reciprocating the decks in a horizontal and vertical oscillatory motion whereby a product to be cooked on any deck is conveyed from the feed end toward the discharge end of that deck;
   a dough dispenser adapted to form pancake-shaped portions of dough, and to deliver such portions to the feed end of the uppermost deck;
   heating means for heating the decks whereby the product is cooked as it is conveyed along the decks; and
   guide means positioned at the discharge end of each deck above a lowermost one in the stack of decks, for inverting and guiding the product from the discharge end of a deck to the feed end of a next lower deck.

5. The oven defined in claim 4 and further comprising a conveyor positioned adjacent the discharge end of the lowermost deck for transporting cooked products from the oven.

6. The oven defined in claim 4 in which the decks are perforated to provide improved traction and to prevent sticking of the product.

7. An oven for cooking tortillas and like products, comprising:
   a frame;
   a plurality of baking decks, each deck having a feed end and a discharge end, each deck including a leaf-spring mounting arm extending therefrom to be connected to the frame, the leaf-spring mounting arms being sloped at about twenty-five degrees from a vertical axis toward the feed ends of the decks and supporting the decks to be movable within a limited range with respect to the frame, the decks being substantially level, vertically spaced apart in a stack, and disposed one above another in alternately opposite first and second orientations so that discharge end of any deck is vertically adjacent the feed end of the next adjacent deck in the stack;
   guide means positioned adjacent the discharge ends of the decks and being adapted to invert and guide a product to be cooked from the discharge end of a deck to the feed end of the next lower deck;
   eccentric drive means coupled to the decks and adapted to reciprocate the decks whereby the decks are driven in a horizontal and vertical oscillatory motion to convey a product along the decks;
   dispensing means positioned adjacent the feed end of an uppermost one of the decks, and being adapted to form metered portions of a product to be cooked, and to deliver such portions to the feed end of the uppermost deck; and
   heating means for heating the decks whereby the product is cooked as it is conveyed along the decks.

8. The oven defined in claim 7 in which the guide means comprises an arcuate plate secured at and spaced from the discharge end of each deck except the lowermost deck.

9. The oven defined in claim 8 in which the decks define a plurality of spaced-apart perforations therethrough.

10. The oven defined in claim 9 in which the drive means comprises a shaft rotatably mounted on the frame; a drive motor coupled to and adapted to rotate the shaft an eccentric bearing on the shaft, and means connecting the eccentric bearing to the decks whereby the decks are reciprocatingly driven.

11. The oven defined in claim 9 in which the drive means comprises a shaft rotatably mounted on the frame, a drive motor coupled to and adapted to rotate the shaft, a pair of eccentric bearings mounted on the shaft, means for connecting one of the eccentric bearings to all decks arranged in the first orientation, and means for connecting the other eccentric bearing to all decks arranged in the second orientation.

12. The oven defined in claim 11 in which the eccentric bearings are oppositely phased such that vibration generated by oscillatory motion of decks in the first orientation tends to be cancelled by vibration generated by oscillatory motion of decks in the second orientation.

13. The oven defined in claim 12 in which the heating means comprises a plurality of gas burners disposed under the respective decks and adapted for coupling to a gas supply, each burner including a valve for controlling gas flow thereto.

14. A process for cooking tortillas and like products, comprising the steps of:
dispensing a body of dough upon a feed end of an elongated vibratory conveyor disposed in an oven and having feed and discharge ends;
conveying the dough in hopping fashion along a portion of a length of the conveyor while the dough is subjected to heat, whereby the dough is repetitively separated from and impacted on the conveyor;
inverting the dough while it is between the feed and discharge ends of the conveyor; and
conveying the inverted dough in hopping fashion toward the discharge end of the conveyor while the dough is further subjected to heat.

15. A process for cooking products composed of dough, comprising the steps of:
dispensing a body of dough upon a feed end of an elongated vibratory conveyor disposed in an oven and having feed and discharge ends, and
conveying the dough in hopping fashion along the vibratory conveyor whereby the dough is repetitively separated from and imparted on the conveyor, the dough being subjected to heat as it is conveyed from the feed end to the discharge end.

16. The process defined in claim 15 and further comprising a preliminary step of forming the body of dough into a pancake-shaped portion prior to dispensing it upon the feed end of the conveyor.

References Cited

UNITED STATES PATENTS

| | | | |
|---|---|---|---|
| 2,376,548 | 5/1945 | McDonald | 214—18 |
| 3,310,007 | 3/1967 | Ford | 107—57 |

FOREIGN PATENTS

| | | |
|---|---|---|
| 114,741 | 2/1942 | Australia. |

EDWARD L. ROBERTS, Primary Examiner

U.S. Cl. X.R.

198—220; 214—18

PO-1050
(5/69)

UNITED STATES PATENT OFFICE
CERTIFICATE OF CORRECTION

Patent No. 3,478,704     Dated November 18, 1969

Inventor(s) John C. Ford

It is certified that error appears in the above-identified patent and that said Letters Patent are hereby corrected as shown below:

In the specification, column 3, line 31, "tie plates and" should read --tie plates 35 and--; line 36, "deck" should read --decks--; line 38, "ech" should read --each--. Column 4, line 7, "aorund" should read --around--; line 69, "deck E" should read --deck 22E--. Column 5, line 3, "results" should read --result--; line 17, "a double peak-to-peak amplitude" should read --a peak-to-peak or double amplitude--.

In the claims, claim 7, column 6, line 37, "so that" should read --so the--. Claim 10, column 6, line 62, "the shaft an" should read --the shaft, an--.

SIGNED AND
SEALED
JUN 2 1970

(SEAL)
Attest:

Edward M. Fletcher, Jr.
Attesting Officer

WILLIAM E. SCHUYLER, JR.
Commissioner of Patents